(12) United States Patent
Harding et al.

(10) Patent No.: US 7,085,913 B2
(45) Date of Patent: Aug. 1, 2006

(54) HUB/ROUTER FOR COMMUNICATION BETWEEN CORES USING CARTESIAN COORDINATES

(75) Inventors: W. Riyon Harding, Richmond, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 09/683,778

(22) Filed: Feb. 13, 2002

(65) Prior Publication Data

US 2003/0154324 A1 Aug. 14, 2003

(51) Int. Cl.
*G06F 15/17* (2006.01)
*G06F 17/50* (2006.01)

(52) U.S. Cl. .................... 712/15; 712/225; 716/13
(58) Field of Classification Search ............. 712/11, 712/17, 18, 33, 36, 15, 227, 225; 710/316, 710/317, 216; 716/13, 17; 370/408
See application file for complete search history.

(56) References Cited

U.S. PATENT DOCUMENTS

| | | | | |
|---|---|---|---|---|
| 5,168,572 A | | 12/1992 | Perkins | 370/349 |
| 5,253,248 A | * | 10/1993 | Dravida et al. | 370/228 |
| 5,495,589 A | * | 2/1996 | Mackenthun et al. | 709/240 |
| 5,613,146 A | | 3/1997 | Gove et al. | 712/20 |
| 5,687,325 A | * | 11/1997 | Chang | 710/104 |
| 5,808,899 A | | 9/1998 | Scepanovic et al. | 716/2 |
| 5,838,683 A | * | 11/1998 | Corley et al. | 370/408 |
| 5,878,265 A | * | 3/1999 | Hartmann | 712/11 |
| 5,898,692 A | * | 4/1999 | Dunning et al. | 370/427 |
| 6,092,174 A | | 7/2000 | Roussakov | 712/15 |
| 6,115,391 A | * | 9/2000 | Sokol | 370/445 |
| 6,145,072 A | | 11/2000 | Shams et al. | 712/22 |
| 6,147,991 A | * | 11/2000 | Rogers | 370/389 |
| 6,226,735 B1 | | 5/2001 | Mirsky | 712/18 |
| 6,247,161 B1 | | 6/2001 | Lambrecht et al. | 716/13 |
| 6,275,975 B1 | * | 8/2001 | Lambrecht et al. | 716/14 |

* cited by examiner

*Primary Examiner*—Daniel H. Pan
(74) *Attorney, Agent, or Firm*—Gibb I.P. Law Firm, LLC; Michael LeStrange, Esq.

(57) ABSTRACT

A method and structure for an integrated circuit is disclosed. The invention includes a plurality of logic cores, a plurality of local hubs connected to said logic cores, and a plurality of global hubs connected to said local hubs. The local hubs and the global hubs transfer data between the logic cores.

25 Claims, 4 Drawing Sheets

HUB/ROUTER FOR COMMUNICATION BETWEEN CORES USING CARTESIAN COORDINATES

BACKGROUND OF THE INVENTION

1. Field of the Invention

The present invention generally relates to communications between logic cores within an integrated circuit and more particularly to an improved system and method that uses local routers and global routers to substantially reduce the number of wires within the integrated circuit.

2. Description of the Related Art

Computer systems have traditionally included a system unit or housing that contains electrical components making up the computer system. A computer system typically includes a motherboard that is configured to hold the microprocessor and memory, and one or more busses that allow the components to communicate. The motherboard typically comprises a plurality of computer chips or electrical components, including intelligent peripheral devices, bus controllers, processors, bus bridges, etc.

More recently, computer systems are evolving toward an integration of functions into a handful of computer chips and to devices that have an entire system (logic, storage, etc.) on a chip (system-on-a-chip (SOC)). This coincides with the ability of chip makers to place an increasingly larger number of logic blocks on a single chip. Thus, computer systems are evolving toward devices with only a handful of computer chips, where each computer chip performs many functions. The integration of a plurality of modules or functions on a single computer chip requires systems that have improved data transfer within the chip architecture. Due to the shorter distances and tighter integration of components on a chip, new data transfer architectures are necessary to take advantage of this environment.

Further, in large application-specific integrated circuits (ASICs) with hundreds of cores, it is difficult to communicate effectively between cores due to the distance of the relative core locations, as well as wiring congestion. The more cores that are placed within a single ASIC, the greater the wiring problems and, thus, communication problems. Therefore, an improved system and method is needed that provides efficient data transfer between the logic modules within an integrated circuit chip.

BRIEF SUMMARY OF THE INVENTION

In view of the foregoing and other problems, disadvantages, and drawbacks of the conventional wiring schemes, the present invention has been devised, and it is an object of the present invention, to provide a structure and method for an improved system and method that uses local routers and global routers.

In order to attain the objects suggested above, there is provided, according to one aspect of the invention, an integrated circuit that includes a plurality of logic cores, a plurality of local hubs connected to the logic cores, and a plurality of global hubs connected to the local hubs. The local hubs and the global hubs transfer data between the logic cores.

The invention includes first data paths that connect the local hubs to the logic cores and second data paths that connect the local hubs to the global hubs, and the global hubs to each other. The local hubs and the global hubs include buffers for storing the data when a data transmission cannot be completed within a given clock cycle. At least one of the local hubs and the global hubs includes control units that select a shortest path to a destination hub. Also, at least one of the local hubs and the global hubs includes logic that selects an alternate path if the shortest path is blocked. Each of the local hubs connects to a plurality of the logic cores and each of the global hubs connects to a plurality of the local hubs. A concentration of the hubs within the circuit is asymmetrical. More hubs are located in areas of high data traffic volume than in areas of low data traffic volume.

The invention also includes an integrated circuit that has a plurality of logic cores. The invention includes a plurality of local hubs that are connected to the logic cores and a plurality of global hubs that are connected to the local hubs. First data paths connect the local hubs to the logic cores and second data paths connect the local hubs to the global hubs, and the global hubs to each other. The local hubs and the global hubs transfer data between the logic cores. The local data paths and the global data paths are independent of one another.

The invention also transfers data between logic cores in an integrated circuit. The invention transfers data from a sending logic core to a first local hub. Next, the invention transfers the data from the first local hub to a first global hub. The invention transfers the data from the first global hub to a second global hub. The invention then transfers the data from the second global hub to a second local hub and transfers the data from the second local hub to a destination logic core. The data identifies the destination logic core using a destination address. Each of the first local hub, the first global hub, the second global hub, and the second local hub transfers the data based upon the destination address. The data is transferred to and from the first local hub and the second local hub over local data paths. The data is transferred between the first global hub and the second global hub over global data paths. Each of the transferring processes select a primary data path that has the shortest distance to the destination logic core. The shortest distance is calculated according to a Cartesian Coordinate system. The invention selects a shortest alternative data path when the primary data path is busy. The shortest alternative data path is the next shortest distance to the destination logic core.

The invention also designs communication pathways between logic cores within an integrated circuit. The invention first connects a plurality of local hubs to the logic cores. The invention then connects a plurality of global hubs to the local hubs. The invention also positions the local hubs and the global hubs according to traffic requirements of the integrated circuits, such that a pattern of the local hubs and the global hubs is asymmetric across the integrated circuit.

The invention performs an initial placement of the local hubs and the global hubs on the integrated circuit. The invention then adds and removes the local hubs and the global hubs according to the traffic requirements. The invention forms local data paths to connect the local hubs to each other, to the logic cores, and to the global hub. The invention forms global data paths to connect the global hubs to each other and to the local hubs.

The forming of the local data paths connects each of the local hubs to all other local hubs. The forming of the global data paths connects each of the global hubs to all other global hubs. Alternatively, the forming of the local data paths connects each of the local hubs to less than all other local hubs. Similarly, the forming of the global data paths connects each of the global hubs to less than all other global hubs. The plurality of the logic cores are connected to each of the local hubs, and a plurality of the local hubs are connected to each of the global hubs.

This invention has the ability to calculate the amount of time a signal will take to reach its destination at every point along the communications path and also has the ability to let the receiving data core know whether or not it will receive its data in the current clock cycle. This invention greatly reduces the number of wires required for efficient communication within a SoC which aides in placing and routing wires, as well as saves manufacturing costs. It also increases the efficiency of the communications, thereby reducing latency and bus arbitration cycles.

BRIEF DESCRIPTION OF THE SEVERAL VIEWS OF THE DRAWINGS

The foregoing and other objects, aspects and advantages will be better understood from the following detailed description of preferred embodiments of the invention with reference to the drawings, in which.

DETAILED DESCRIPTION OF THE INVENTION

Detailed Description of Preferred Embodiments of the Invention

As mentioned above, in large ASICs, it is difficult to communicate effectively between cores due to the distance between core locations and the wiring congestion. The more cores that are placed within a single ASIC, the greater the wiring problems and communication problems. By eliminating the wiring congestion using super highways (global data paths) and local highways (local data paths) controlled by local and global hub/routers, the invention effectively alleviates communication problems and wiring congestion. Additionally, by placing more local and global hubs in areas of greatest congestion and required communication demand (and less hubs in areas of low demand), the invention creates a highly-effective communication environment on a chip level.

Figure 1:
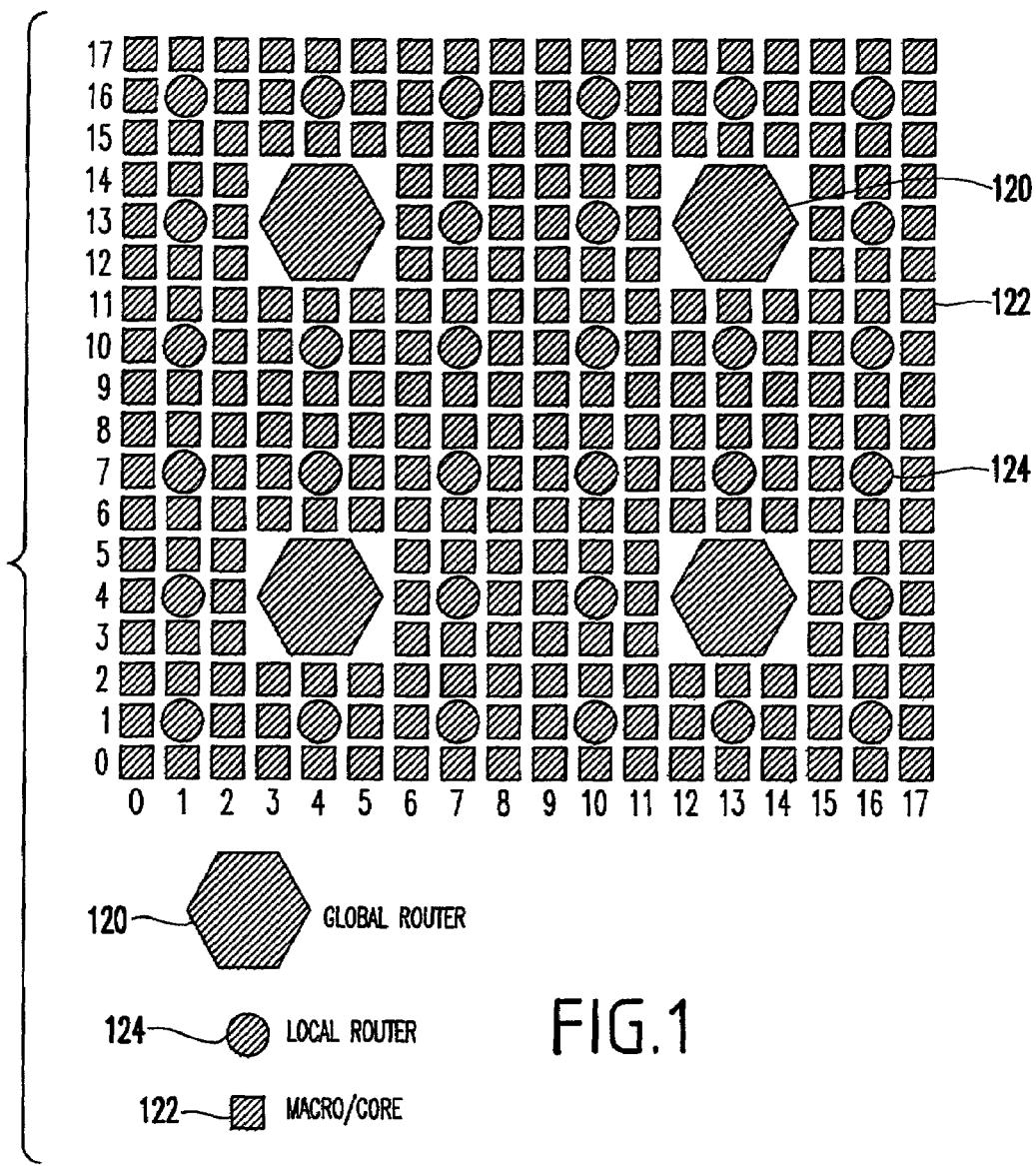
FIG. 1 is a schematic diagram of local and global routers according to the invention.

More specifically, as shown in FIG. 1, the invention provides global hubs 120 and local hubs 124 connecting the logic cores 122. With the invention, each core 122 is connected directly to a local router hub 124. The local hubs 124 are connected in a grid-like pattern to one another as well as to global hubs 120. There are local hubs 124 connected directly to a global hub 120 and each global hub 120 is connected to every other global hub. This structure effectively connects many cores 122 to a local hub 124, and many local hubs 124 to a global hub 120 which, in turn, connects to a large number of other global hubs 120.

Figure 2:
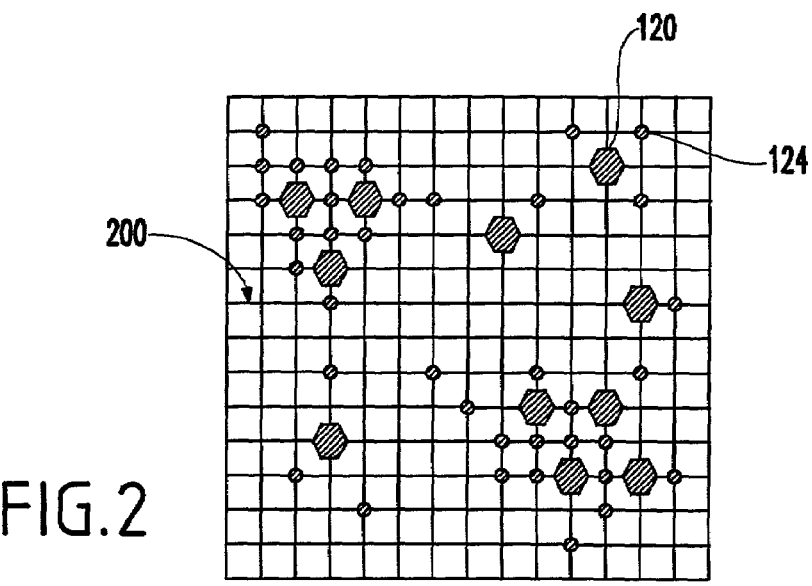
FIG. 2 is a schematic diagram showing the placement of logic blocks, local routers, and global routers.

FIG. 1 shows the most densely populated possible core, local and global hub layout. For example, FIG. 1 could represent a greatly blown up left most corner of an ASIC. The hub points would be in the tens of thousands for actual circuit designs. There is no real limit to the size of the chip that can be used with the invention; the X and Y coordinates would simply extend to the desired size. For any single cycle, with conventional structures, the majority of wires on current designs are inactive, which produces a low effective utilization factor (UF). With conventional wiring interconnect methodologies, a large number of global wires exist while, at the same time, the UF is low. Low UF is characteristic of a poor design based upon wire constraints imposed during the routing process. To the contrary, the invention increases UF by symmetrically positioning hubs according to the highest communication density requirements. Thus, more hubs would be located in high fanout areas and less would be placed in low use areas. For example, FIG. 2 illustrates a less densely populated circuit design than that shown in FIG. 1, where the global hubs 120 and the local hubs 124 are clustered together, depending upon communication density requirements. In other words, the upper left corner and lower-left corner of the schematic diagram shown in FIG. 2 have logic circuits that are predicted to place more demand upon the communication system when compared to the other areas of the circuit.

Regarding how the increased communication demand is determined, when the architects create the system architecture, they will already know, based on system design, where the high-traffic and low-traffic areas reside in the system and can, thus, place hubs/routers where they will be most efficient.

With the invention, the wiring tool is linked with the simulation environment to analyze the UF factor. A simple node toggle calculator can be used during simulation to determine the macro-to-macro communication volume and density.

When possible, the invention uses existing busses. However, in certain cases (such as primary architecture busses), the UF factor will be too high, and the hub wiring will by-pass the existing busses. In these situations, the hub wires will be dedicated wiring channels. However, due to the reduction of global wiring achieved with the invention (using the hubs) the ability to high UF wires is easier.

Thus, the invention places the hubs with consideration of the final placement of other elements in the finalized design. Therefore, while there may be an initial plan of where the hubs will be located, the actual placement is based upon the actual circuits in the region. For example, if a very large ram array is placed in a corner of the die in the final design, the hub generator will delete global hubs in this area since they would serve little or no purpose. In other words, the invention can preliminarily space local and global hubs uniformly across the chip. This initial pattern can be modified into an asymmetric pattern by adding or removing hubs to accommodate the components that are added as the circuit design is finalized. So, in the majority of instances, the actual hub placements will be a subset of the maximum-allowable hubs. This allows flexibility in floor planning and in the chip build process.

Therefore, with the invention, a larger number of local and global hubs are placed in higher communication demand regions. In addition, FIG. 2 illustrates the local data paths 200 that are utilized to connect the local hubs 124 to the global hubs 120. In FIG. 2, the local data paths 200 are shown in a grid pattern. However, the invention is not limited to such a grid pattern and the local data paths could take on any configuration, depending upon the designer's wiring limitations.

Figure 3:
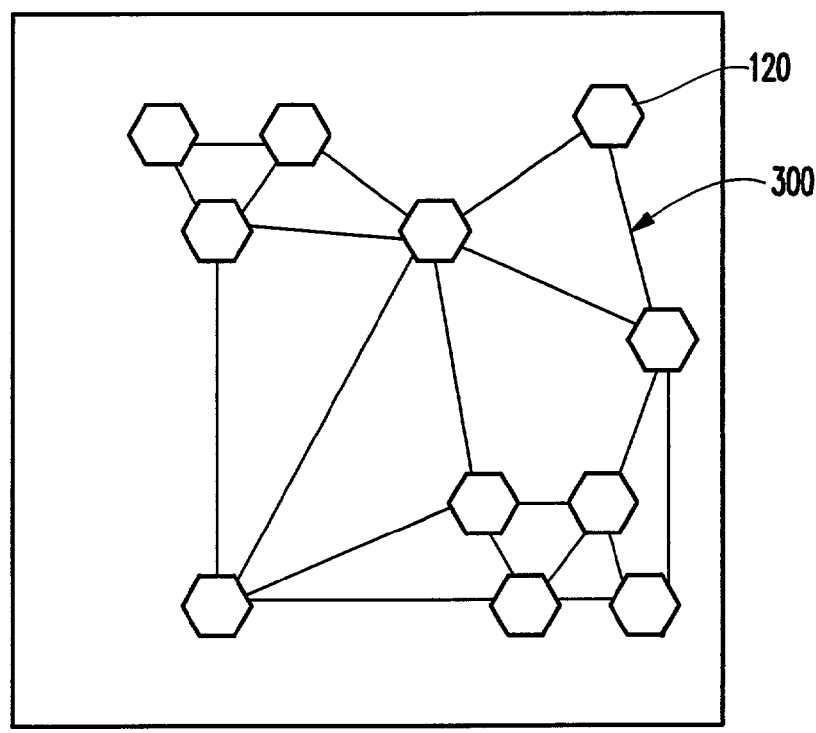
FIG. 3 is a schematic diagram showing the connections between the global routers.

FIG. 3 illustrates the same circuit without showing the local hubs 124 or the local data paths 200. Instead, FIG. 3 is a schematic diagram that only illustrates the positions of the global hubs 120 and the global data paths of 300. Each global hub 120 can be connected to every other global hub 120. However, in the embodiment shown in FIG. 3, the connections between the various hubs 120 is limited such that data may possibly flow through a number of global hubs before reaching the destination local hub. The pattern, length and volume of global data paths between the various global hubs 120 will vary depending upon circuit size and the space available for wiring. The global path is connected to the local router system and is, thus, coupled to the local paths. However, in an instance where a core sends its destination address and packet of data directly to a global router (whose destination core is likewise directly coupled to another global router), then the global path would be independent of the local path. Similarly, if a core sends its destination address and data to a local hub/router and its destination core is close in proximity such that only the local paths will be used for data transfer, then the local path is independent of the global path.

An important feature of the invention is the data "super highways" that are created by the global data paths 300. More specifically, with conventional systems, data must travel directly from logic core-to-logic core in order to reach destination cores. Alternatively, data could be passed from local hub-to-local hub in order to be moved across the integrated circuit. However, such systems require substantial amounts of time to transfer such data. To the contrary, with the invention, data can move directly across the entire circuit by simply passing the data from one global hub to another global hub (assuming that the design allows such global data paths). Alternatively, with the structure shown in FIG. 3, which does not have every hub connected to every other hub, only a limited number of global hubs need to be involved with the data transfer.

Therefore, the invention is superior to conventional structures that pass data from logic core-to-logic core (or local hub-to-local hub) because the invention can pass data using substantially fewer intervening data transfers. For example, passing data from logic core-to-logic core may involve thousands or tens of thousands of individual data transfers to move data across a chip. To the contrary, with the invention, an originating logic core passes data to an originating local hub, the originating local hub passes the data to an originating global hub, the originating global hub passes the data to a destination global hub across the chip (either directly or through a very small number of other global hubs (e.g., less than 100)), and the destination global hub passes the data to a destination local hub, which in turn passes the data to a destination logic core. Therefore, while conventional systems may involve thousands of individual data transfers, the invention can pass the same information across the same distance using, for example, less than 10 data transfers (e.g., a 90–99%) reduction. Therefore, the invention passes the data much faster and much more reliably than conventional systems.

The invention also reduces wire congestion on integrated circuit dies. More specifically, in order to avoid the delays associated with passing data from one logic core to another logic core, when moving data across a chip, each logic core can be connected to every other logic core on the chip. However, such a solution substantially increases the volume of wiring on the chip when compared with the invention. For example, if 64 cores are connected to each other, 63 bi-directional wires would be needed from the first core to all of the other cores. This would require 62 wires from the next core to all of the other cores (the wire from the first core is not counted twice), and so on. In equation form, this is represented as (n−1)+(n−2)+ . . . +(n−(n−2))+(n−(n−1))+(n−n). This equation simplifies to (n−1)(n/2). Thus, for 64 cores, 1,984 wires would be needed to connect each core to every other core. However, with the inventive structure, using local hubs, each core is connected to every other core using only 64 wires required from core to local hub (for 8 local hubs with 8 cores per hub=64) and 28 wires ((8−1))*(8/2)) to connect each local hub to every other local hub, for a total of 92 wires, as opposed to 1,984 wires with conventional systems. An additional 8 wires are required to connect each local hub to a global hub, for a grand total of 100 wires. Conventionally, 256 cores would require 32,768 wires. With the invention, 256 cores could be set up into four groups of 100 wires (400 wires). The additional 6 wires needed to connect the 4 global hubs yields a total of only 406 wires. This results in a 98.77% wiring reduction when the invention is compared to conventional structures.

Figure 4:
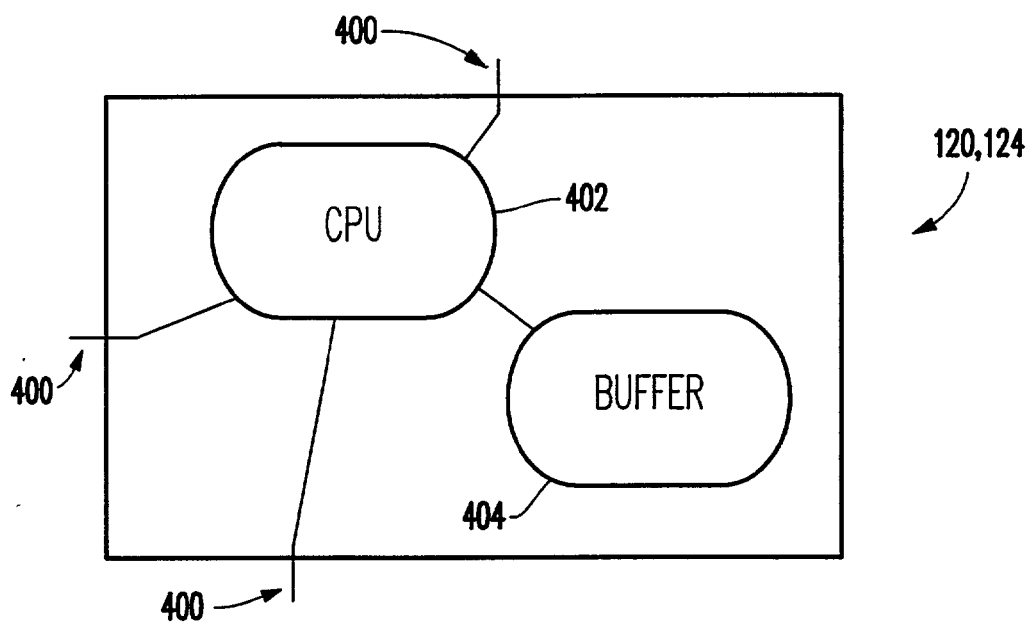
FIG. 4 is a schematic diagram of a logic core.

As shown in FIG. 4, each of the hubs 120, 124 includes one or more input/output connectors 400 that connect to the data paths 200, 300. In addition, a logic device 402, such as a central processing unit and a buffer 404, are provided within one or more of the hubs 120, 124. In operation, each hub 120,124 receives data being transferred through the input/output connectors 400. The data includes information regarding the destination logic core in, for example, header information. The logic device 402 locates the shortest data path and forwards the data along that path.

To determine the shortest (and quickest) data path, the invention uses a Cartesian Coordinate system (e.g., X–Y numbered coordinate system, shown in FIG. 1) on the physical chip to determine the physical location of each core. The logic device 402 calculates the best path from relatively distant cores, such as core (11,6) to core (1,15), just as easily as closely spaced cores (13,8) to (12,9). By using a simple algorithm which calculates the distance between the two cores in the X direction and then in the Y direction, the logic device 42 identifies the fastest path. Additionally, if one path is busy, the logic device 42 dynamically identifies an alternate path.

Since each core is connected to a local hub, each core sends a destination address along with the packet of data to its local hub. The local hub then performs the calculations using its own address on the Cartesian grid, as well as the destination address to determine the best routing method. If the distance between the logic cores is less than or equal to a predetermined number (e.g., 2) of rows and columns, then local hub highways are used. If the distance is greater than 2 rows or 2 columns, as in this example, then global highways are used for routing. If no path can be found to be available (i.e., the paths are all busy) within a reasonable amount of time, a timeout error occurs and the originating core is notified that its packet could not be sent. If the sending core does not receive an error, then it can be assumed that the transfer was successful.

Figure 5:
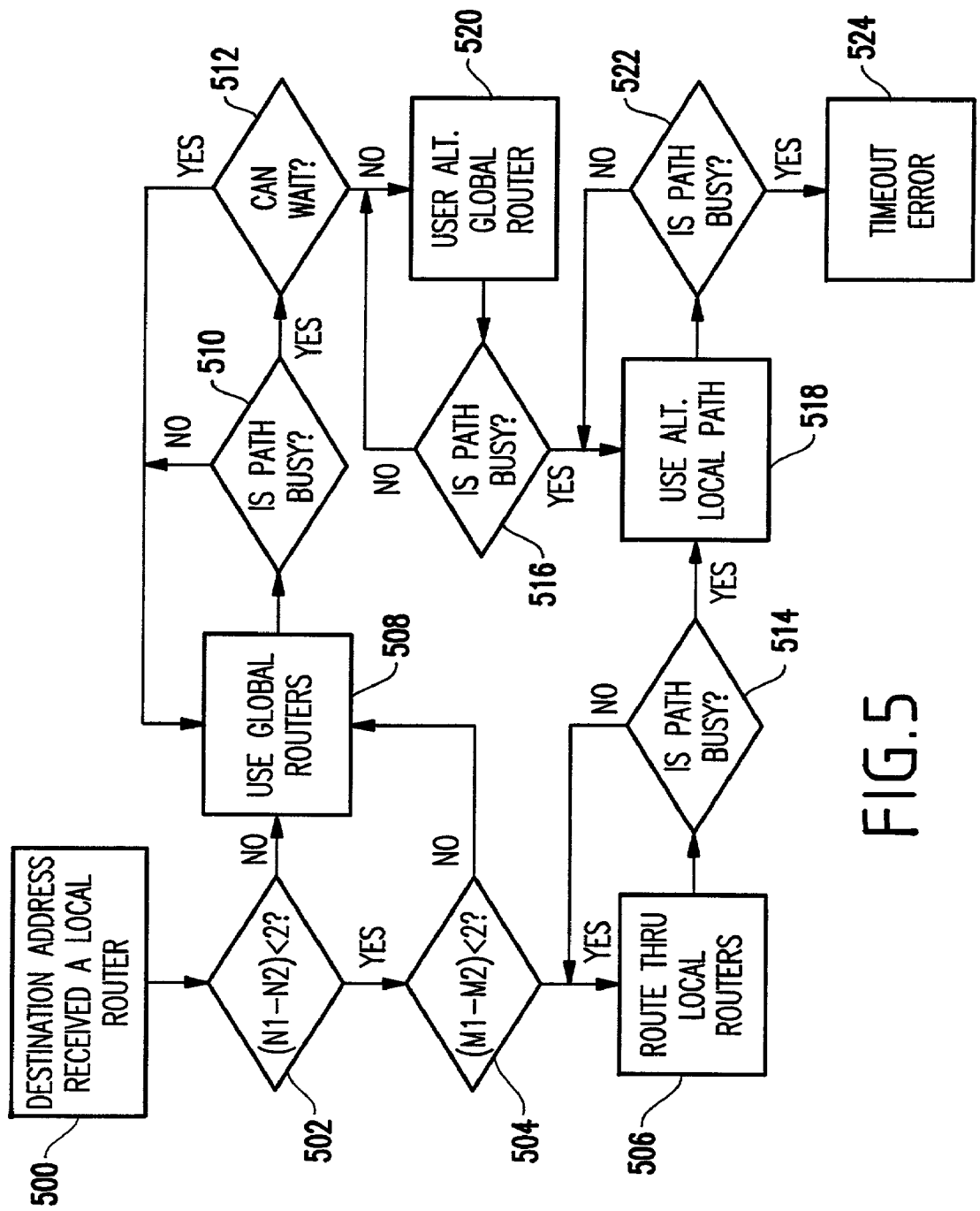
FIG. 5 is a flowchart illustrating the logic utilized to direct signals between the local routers, global routers, and logic blocks.

A flowchart of the decision process is shown in FIG. 5. More specifically, in item 500, a packet of data, including a destination address, is received at a local hub 124. Then, in item 502, the invention compares the local hub's Cartesian Coordinate location with the destination location in one direction of the coordinate system (N) to determine whether the absolute value difference between the two locations exceeds the predetermined limit (|N1−N2|m2). In these examples, the predetermined limit is 2, however, as would be known by one ordinarily skilled in the art, any limit could be utilized. In a similar manner, in item 504, the absolute value of a perpendicular coordinate (M) is checked to see whether it exceeds the predetermined limit (|M1−M2|m2).

If neither coordinate value difference exceeds the predetermined limit, processing proceeds to item 506 and the data is routed through local hubs. If either coordinate system exceeds the predetermined limit (as determined in item 502 and 504) then global hubs are used, as shown in item 508. The invention checks whether the local and the global paths are busy in items 510 and 514, and continues to process the request through the global or local data paths as long as the paths are not busy.

In item 512, if the first global data path is busy and there is sufficient time (i.e., enough time before the end of the clock cycle) to wait for the path to become available, processing proceeds back to item 508 to wait for the availability of the busy path. If processing cannot wait (item 512), the processing proceeds to item 520 where alternative global hubs/data paths are used. Sufficient time is determined by the control logic in the hub/routers which calculates the distance left to travel to the destination and compares that to how much of the clock cycle is left. If there is sufficient time for the data to reach the destination core, the hub/router proceeds with the transaction. If there is not enough time, (i.e., the destination core is still too far away), then the hub/router buffers the data and launches it again at the beginning of the next clock cycle. Such a delayed data packet has priority over other data packets during the subsequent clock cycle(s).

In a similar manner, if a local path is busy, as determined in item 514, the invention will utilize an alternative local path in item 518. In item 516, if the alternative global paths are also busy, processing also proceeds to item 518 where an alternate local path is utilized in place of the global path. In item 522, if the alternative local path is also busy, a timeout error is produced in item 524, otherwise processing loops back to item 518 to continue to use the alternate local path. Therefore, the invention dynamically selects between the different local and global data paths in order to redirect the data being transferred around the busy paths.

From these physical locations, the invention also calculates the exact distance between the present location and the other cores, and determines the signal delay time that it will take for data to travel from the source core to the destination core. If this time estimate exceeds the time remaining within the current clock cycle, the data is stored in the buffer 404 until the next clock cycle. Due to the nature of a digital logic, data is passed through a core of logic from one latch to another. Latches are typically triggered by a clock pulse edge driven by a system clock. Therefore, when a latch gets a clock edge pulse (usually rising), it outputs the data it has stored. The receiving latch has until the falling edge of the same clock cycle to capture the data. To keep the system stable, all transfers must be made within the same clock cycle.

Similarly, if a hub is required to wait for a busy path to become available (or a busy hub to become available) and the time necessary for that hub or path to become available extends beyond the present clock cycle, the data is stored in a buffer 404 within the waiting hub to prevent it from being lost. During the time when a hub is waiting to transfer data along a busy path or to a busy hub, the waiting hub that is holding information in the buffer 404 will refuse to accept any additional data. This prevents the loss or mixture of data. Buffer 404 is used to store the current packet of data that is at the hub/router awaiting its next hub/router or final core destination. The control logic determines whether there is enough time to get the data to the final destination within the amount of time left in the clock cycle and the distance to the core. If there is not enough time, the buffer stores the data and the control logic asserts a signal to the core to let it know that the data it was expecting this cycle will not arrive until at least the following clock cycle.

Figure 6:
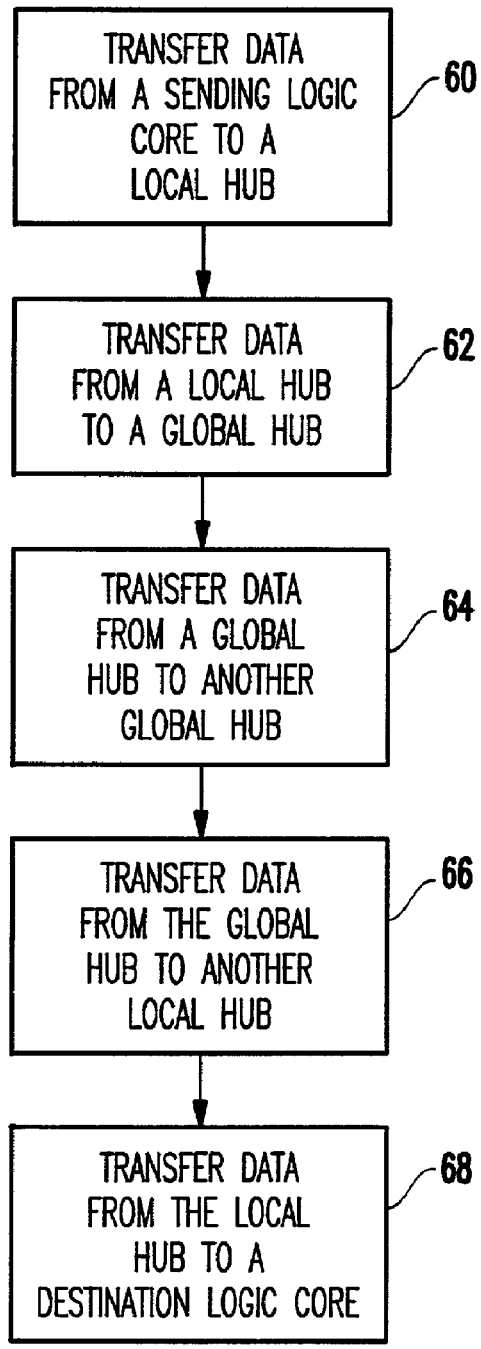
FIG. 6 is a flowchart illustrating the transfer of data between the logic cores in an integrated circuit.
Figure 7:
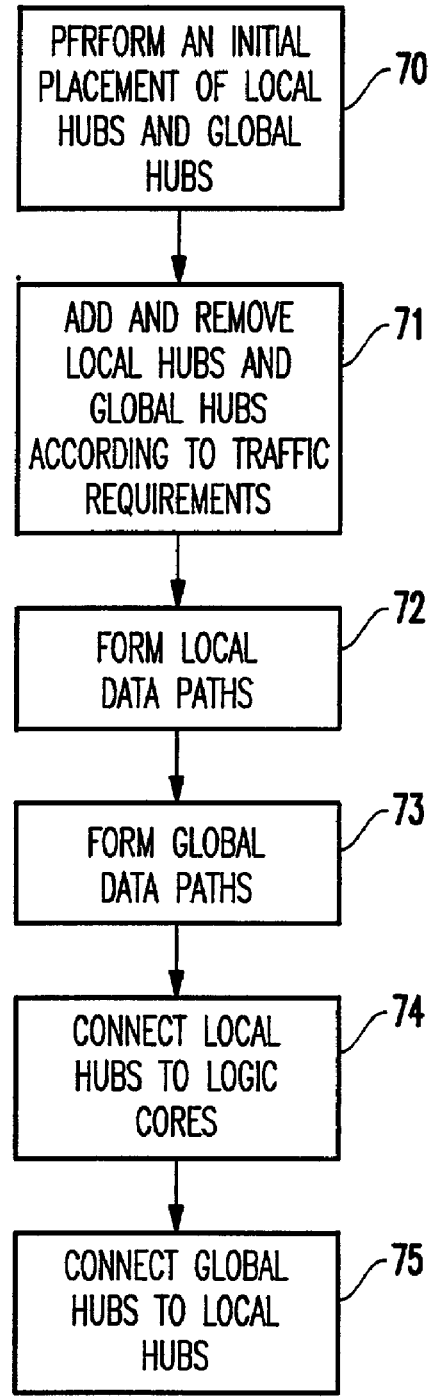
FIG. 7 is a flowchart illustrating the communication pathways between logic cores within an integrated circuit.

A flowchart of the transfer process is shown in FIG. 6. In item 60, the invention transfers data from a sending logic core to a local hub. Next, in item 62, the invention transfers data from a local hub to a global hub. Then, in item 64, the invention transfers data from a global hub to another global hub. In item 66, the invention transfers data from the global hub to another local hub. Lastly, in item 68, the invention transfers data from the local hub to a destination logic core. A flowchart of the formation process for communication pathways is shown in FIG. 7. First, in item 70, the invention performs an initial placement of local hubs and global hubs. Next, in item 71, the invention removes local hubs and global hubs according to traffic requirements. Then, in item 72, the invention forms local data paths. In item 73, the invention forms global data paths. Next, the invention connects local hubs to logic cores in item 74. Lastly, in item 75, the invention connects global hubs to local hubs.

With the invention, a local hub attempting to transfer data to a global hub, or a global hub attempting to transfer data to another global hub, will preferably select the next destination hub as the one that requires the shortest distance (and, therefore, the shortest delay time) to the ultimate destination logic core. Therefore, each hub will attempt to direct the data over paths (local and global) that include the fewest number of intermediate hubs and which transfers data in a straight line (e.g., the primary data path). However, as mentioned above, when the primary data path is busy, alternate paths that include global and local hubs can be utilized. Further, each hub makes an individual decision regarding the next destination hub (local or global) given the path availability and time remaining within the clock cycle. Thus, data being transferred over a series of hubs may be within an intermediate hub (in the series of hubs) when a clock cycle ends. In such a situation, the intermediate hub stores the data in the buffer 404 until the next clock cycle. This ensures that no data will be lost during the transition to the next clock cycle (i.e., no metastability occurs within the system). The hub/router that stores the data in its buffer 404 will then send the data to the next hub/router in the chain or to the destination core itself at the beginning of the new clock cycle. It does this first because it must have an empty buffer 404 before it can accept new data. Otherwise, the new data coming down the path would overwrite the existing data.

Further, the invention provides the ability to broadcast (know) delay propagation. Since the Cartesian Coordinate system permits a fixed wiring plan/image, once the wiring has been established, the propagation delay of the network is deterministic. Each of the hub/routers has a direct line to each of the cores. It is simply a small, one-bit wire that asserts when the data will not be available in the current clock cycle. In the present invention, this signal is called the NTC signal (Not This Cycle). Thus, the core requesting the data will know that the data it requested will not be available this clock cycle and, thus, it should latch no data as such. The destination core latches its data only when the NTC signal is deasserted. This ensures that the correct data is captured at the destination core in the correct clock cycle. The other hubs/routers do not read a NTC signal from another hub/router. They only have the ability to assert or deassert the signal to the destination core. Since the other hub/routers have no record of other hub/routers history of asserting or deasserting the NTC signal, it is not necessary for them to contain any logic to analyze the statistics of the NTC signal for other paths. The NTC signal's only function is to let the destination core know that its data will not be ready during this cycle, although it is highly-likely that it will receive the data in the next cycle.

For timing critical nets, a priority scheme can be added to the hub routers to weigh the critical nets, first for prime hub path routing. If a hub/router receives two packets of information from two different locations at the same time, it will analyze which packet to send first, based on a simple priority scheme. Each packet contains a priority code along with the other header information about its source and destination. The packet with the highest priority gets routed on the most direct route first while the second packet is stored in the buffer 404. When the highest priority packet has been sent on its way, the second packet is then sent on its most direct path. If a third packet is forwarded while the hub/router is analyzing the first packet and has the second packet stored in the buffer, the third packet is rejected and a busy signal is sent to the originating core or hub/router. However, once the second packet is sent and the buffer is cleared, that third packet could then be accepted and routed, should the original requestor try again. It is likely, however, that the requestor has found an alternate path by this point.

This invention has the ability to calculate the amount of time a signal will take to reach its destination at every point along the communications path and also has the ability to let the receiving data core know whether or not it will receive its data in the current clock cycle. This invention greatly reduces the number of wires required for efficient communication within a SoC which aides in placing and routing, as well as saves manufacturing costs. It also increases the efficiency of the communication by reducing latency and bus arbitration cycles seen in most systems today.

While the invention has been described in terms of preferred embodiments, those skilled in the art will recognize that the invention can be practiced with modification within the spirit and scope of the appended claims.

What is claimed is:

1. An integrated circuit comprising:
   a plurality of logic cores;
   a plurality of local hubs connected to said logic cores; and
   a plurality of global hubs connected to said local hubs,
   wherein at least one local hub is physically positioned between said global hubs, and said global hubs pass data to each other directly, without passing data through physically intervening local hubs, and
   wherein a physical distance between said local hubs is greater than a physical distance between said logic cores and a physical distance between said global hubs is greater than said physical distance between said local hubs.

2. The integrated circuit in claim 1, further comprising:
   first data paths connecting said local hubs to said logic cores; and
   second data paths connecting said local hubs to said global hubs and said global hubs to each other.

3. The integrated circuit in claim 1, wherein said local hubs and said global hubs include buffers for storing said data when a data transmission cannot be completed within a given clock cycle.

4. The integrated circuit in claim 1, wherein, at least one of said local hubs and said global hubs includes a processor that selects a shortest path to a destination hub.

5. The integrated circuit in claim 4, wherein at least one of said local hubs and said global hubs includes a processor that selects an alternate path if said shortest path is blocked.

6. The integrated circuit in claim 1, wherein each of said local hubs connects to a plurality of said logic cores and each of said global hubs connects to a plurality of said local hubs.

7. The integrated circuit in claim 1, wherein more hubs are located in areas of high data traffic volume than in areas of low data traffic volume.

8. An integrated circuit comprising:
   a plurality of logic cores;
   a plurality of local hubs connected to said logic cores;
   a plurality of global hubs connected to said local hubs, wherein at least one local hub is physically positioned between said global hubs, and said global hubs pass data to each other directly, without passing data through physically intervening local hubs;
   first data paths connecting said local hubs to said logic cores; and
   second data paths connecting said local hubs to said global hubs and said global hubs to each other,
   wherein said local hubs and said global hubs transfer data between said logic cores, and
   wherein said local data paths and said global data paths are independent of one another, wherein a physical distance between said local hubs is greater than a physical distance between said logic cores and a physical distance between said global hubs is greater than said physical distance between said local hubs.

9. The integrated circuit in claim 8, wherein said local hubs and said global hubs include buffers for storing said data when a data transmission cannot be completed within a given clock cycle.

10. The integrated circuit in claim 8, wherein at least one of said local hubs and said global hubs includes a processor that selects a shortest path to a destination hub.

11. The integrated circuit in claim 10, wherein at least one of said local hubs and said global hubs include a processor that selects an alternate path if said shortest path is blocked.

12. The integrated circuit in claim 8, wherein each of said local hubs connects to a plurality of said logic cores and each of said global hubs connects to a plurality of said local hubs.

13. The integrated circuit in claim 8, wherein more hubs are located in areas of high data traffic volume than in areas of low data traffic volume.

14. A method of transferring data between logic cores in an integrated circuit, said method comprising:
   transferring data from a sending logic core to a first local hub;
   transferring said data from said first in local hub to a first global hub, wherein at least one local hub is physically positioned between said global hubs;
   transferring said data from said first global hub to a second global hub directly, without passing data through physically intervening local hubs;
   transferring said data from said second global hub to be a second local hub; and
   transferring said data from said second local hub to a destination logic core,
   wherein a physical distance between said local hubs is greater than a physical distance between said logic cores and a physical distance between said global hubs is greater than said physical distance between said local hubs.

15. The method in claim 14, wherein said data identifies said destination logic core using a destination address and each of said first local hub, said first global hub, said second global hub, and said second local hub transfer said data based upon said destination address.

16. The method in claim 14, wherein said data is transferred to and from said first local hub and said second local hub over local data paths; and
wherein said data is transferred between said first global hub and said second global hub over global data pats.

17. The method in claim 14, wherein each of said transferring processes includes a process of selecting a primary data path that comprises a shortest distance to said destination logic core.

18. The method in claim 17, wherein said shortest distance is calculated according to a Cartesian Coordinate system.

19. The method in claim 17, further comprising selecting a shortest alternative data path when said primary data path is busy, wherein said shortest alternative data path comprises a next shortest distance to said destination logic core.

20. A method of implementing communication pathways between logic cores within an integrated circuit said method comprising:
connecting a plurality of local hubs to said logic cores;
connecting a plurality of global hubs to said local hubs such that at least one local hub is physically positioned between said global hubs; and
connecting said global hubs together such that said global hubs pass data to each other directly, without passing data through physically intervening local hubs,
wherein a physical distance between said local hubs is greater than a physical distance between said logic cores and a physical distance between said global hubs is greater than said physical distance between said local hubs.

21. The method in claim 20, wherein said positioning comprises:
performing an initial placement of said local hubs and said global hubs on said integrated circuit; and
adding and removing said local hubs and said global hubs according to said traffic requirements.

22. The method in claim 20, further comprising:
forming local data paths to connect said local hubs to each other, to said logic cores, and to said global hubs; and
forming global data paths to connect said global hubs to each other, and to said local hubs.

23. The method in claim 22, wherein said forming of said local data paths connects each of said local hubs to all other local hubs; and
wherein said forming of said global data paths connects each of said global hubs to all other global hubs.

24. The method in claim 22, wherein said forming of said local data paths connects each of said local hubs to less than all other local hubs; and
wherein said forming of said global data paths connects each of said global hubs to less than all other global hubs.

25. The method in claim 20, wherein a plurality of said logic cores are connected to each of said local hubs, and wherein a plurality of said local hits are connected to each of said global hubs.

* * * * *